Oct. 18, 1932.    H. R. BRAND    1,883,517
AUTOMATIC SALES SYSTEM
Filed May 7, 1928    8 Sheets-Sheet 1
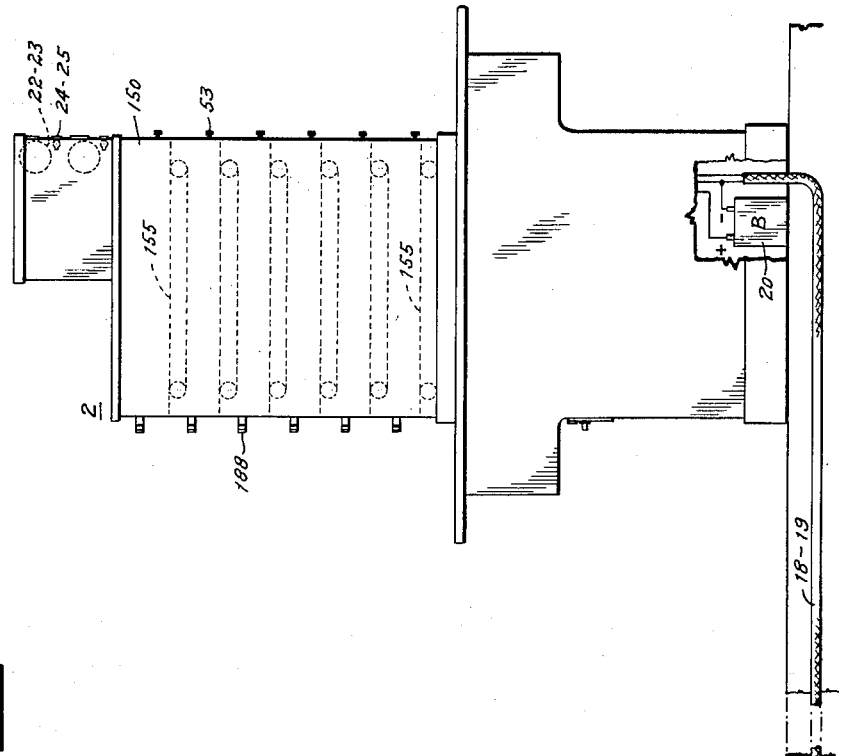
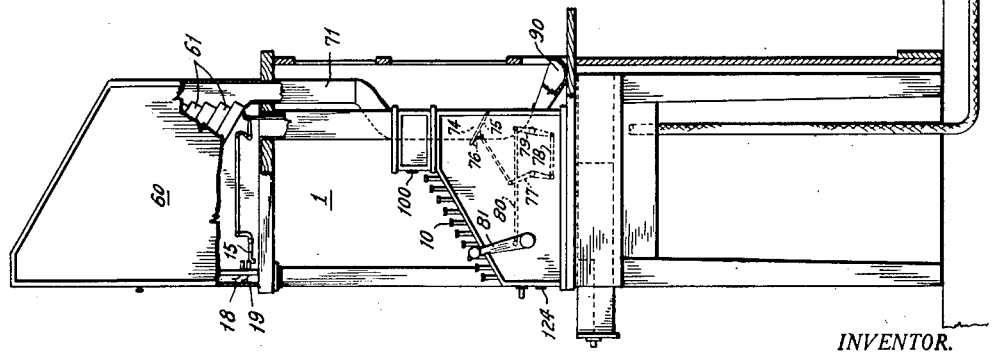
Fig. 1
INVENTOR.
H. R. Brand
BY
ATTORNEY

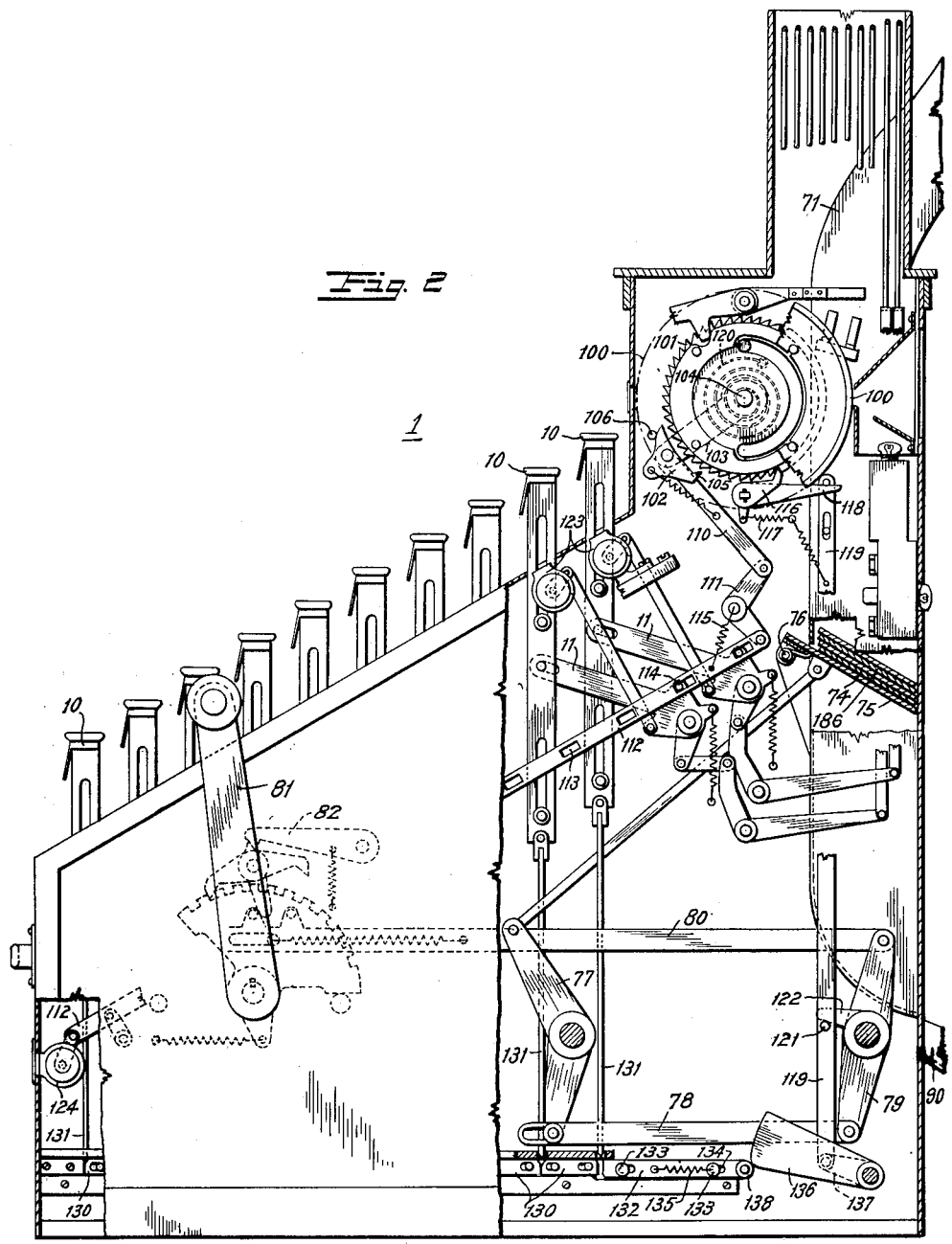

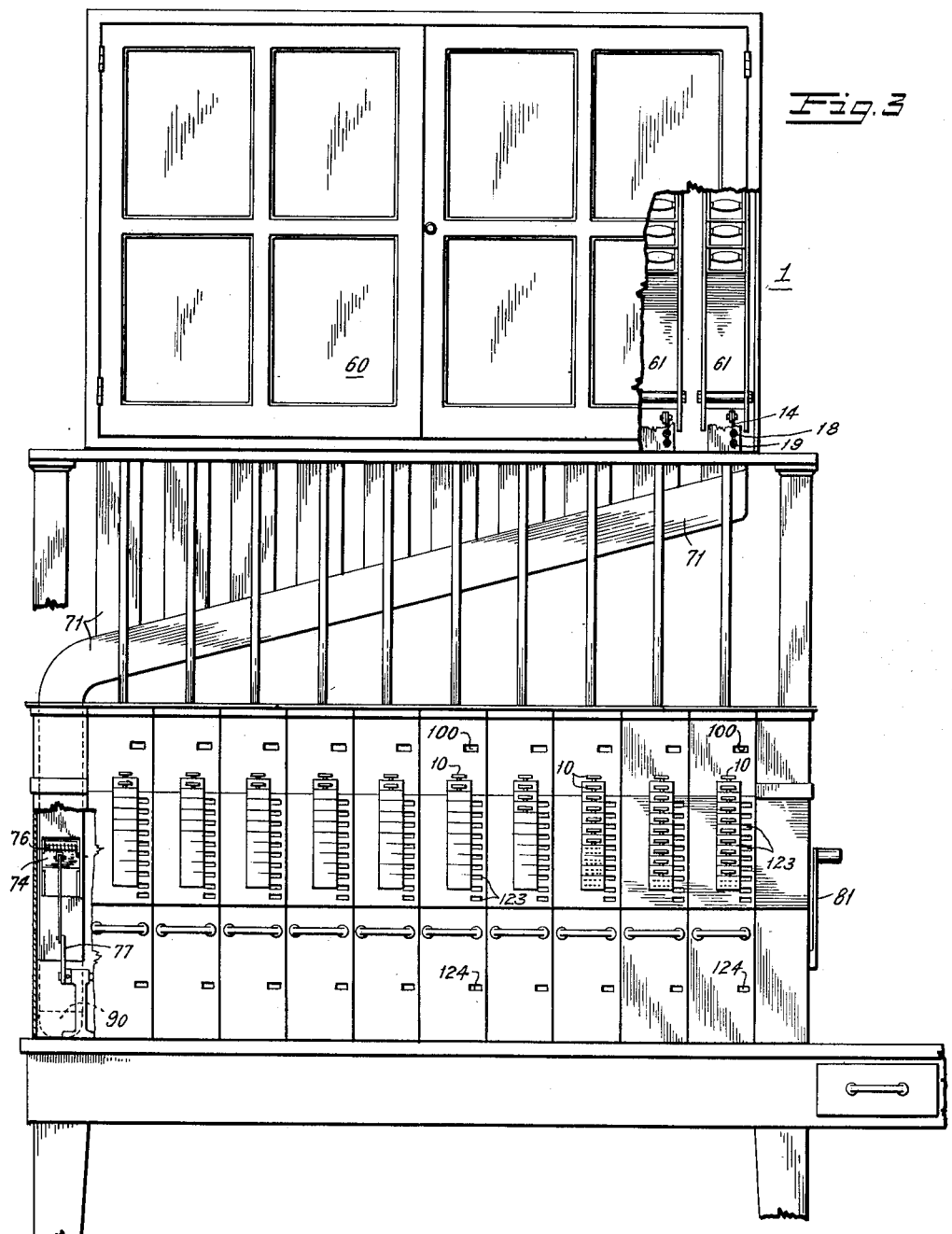

Oct. 18, 1932.  H. R. BRAND  1,883,517
AUTOMATIC SALES SYSTEM
Filed May 7, 1928  8 Sheets-Sheet 4
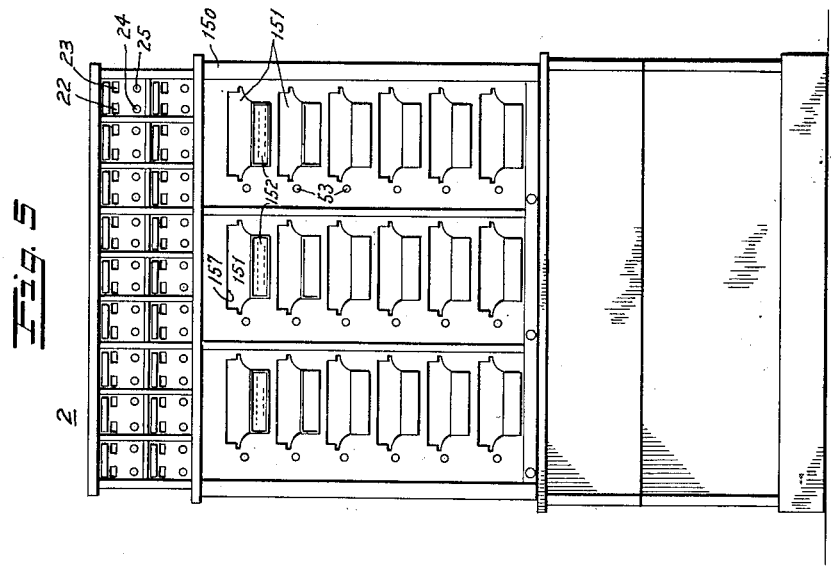
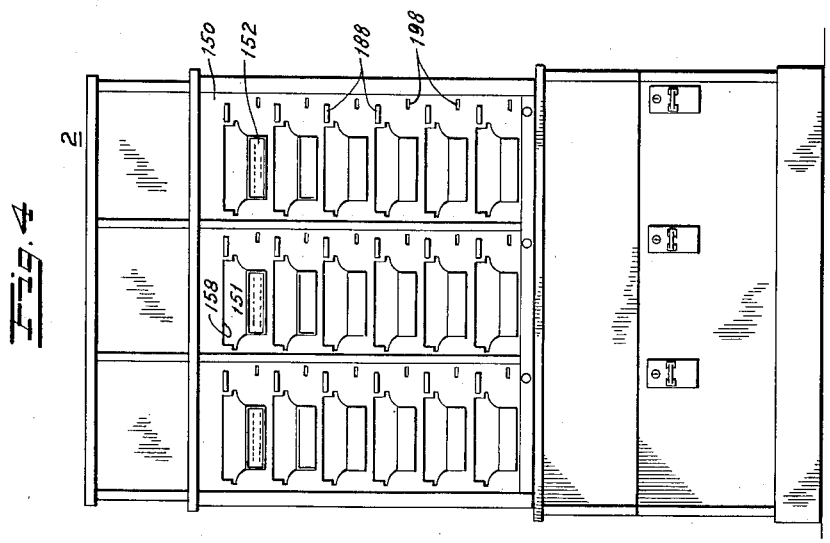
INVENTOR.
H. R. Brand
BY
ATTORNEY Oct. 18, 1932.    H. R. BRAND    1,883,517
AUTOMATIC SALES SYSTEM
Filed May 7, 1928    8 Sheets-Sheet 5
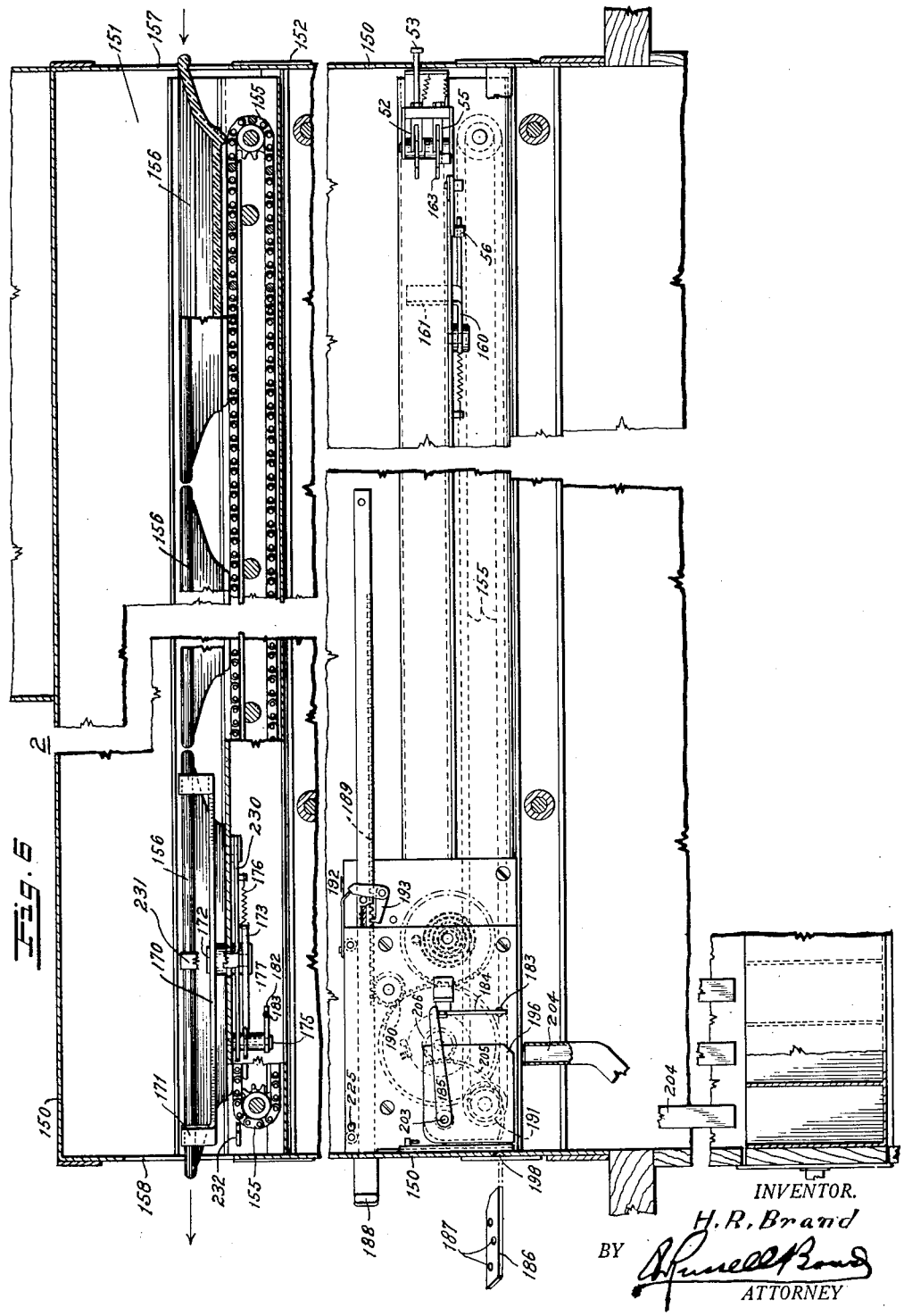
INVENTOR.
H. R. Brand
BY
ATTORNEY Oct. 18, 1932.  H. R. BRAND  1,883,517
AUTOMATIC SALES SYSTEM
Filed May 7, 1928  8 Sheets-Sheet 6

INVENTOR.
H. R. Brand
BY
ATTORNEY

Oct. 18, 1932. H. R. BRAND 1,883,517
AUTOMATIC SALES SYSTEM
Filed May 7, 1928 8 Sheets-Sheet 8

INVENTOR.
H. R. Brand
BY
ATTORNEY.

Patented Oct. 18, 1932

1,883,517

UNITED STATES PATENT OFFICE

HARRY RUSSELL BRAND, OF NEW YORK, N. Y.

AUTOMATIC SALES SYSTEM

Application filed May 7, 1928. Serial No. 275,722.

This invention relates to automatic sales systems and more particularly to systems for dispensing foods on order.

It is an object to provide a system of the character described by which an article may be prepared and vended on order with complete automatic control over the operation at all times.

It is a further object of this invention to provide a single and practical system in which the ordering of an article from a distant point is so correlated with the delivery of it as to insure that the delivery shall be made only in response to an authenticated order, for which some one may be held directly responsible and failure to obtain proper payment may be directly traced.

It is a further object to provide a system by which the ordering of an article automatically registers at the serving station, enabling the server to keep separate account of unacknowledged orders, and of orders acknowledged but not served.

It is a further object to provide a system adapted for rapid service, which may be utilized either for service or for self service, with a complete control over the operations in either event, but without the need of alterations in the mechanism.

It is a further object to provide a system by which a plurality of articles may be separately ordered, and the total ascertained for payment without surrender of the control over the articles until payment is made.

It is a further object to provide a system by which the articles may be served by the server in response to an order, at his convenience, regardless of the presence of the recipient but which will permit the delivery to the recipient at any subsequent time at the convenience of the recipient.

It is a further object to provide such a system which shall be practicable and reliable at all times but which shall be inexpensive to manufacture and simple in operation.

Other objects will be in part obvious and in part will be pointed out hereinafter.

Fig. 1 is a side elevation of an apparatus constituting one embodiment of my invention.

Figs. 2 and 3 are respectively a side and a front elevation of the ordering machine in greater detail.

Figs. 4 and 5 are front and rear elevations respectively of the serving machine.

Fig. 6 is a vertical section through the serving machine on a broken plane perpendicular to the paper in Figs. 4 and 5.

The system comprises generally an ordering machine 1 by which any one of a plurality of diverse articles may be ordered as desired and a serving machine 2 which not only receives the order and keeps account of whether the order has been acknowledged or served, but also, retains control of the article until released to an identified recipient.

The ordering machine itself forms the subject matter of and is shown more fully in my copending application Serial No. 191,805 filed May 16, 1927, in which the construction is shown in greater detail and the serving machine forms the subject matter of and is shown more fully in my copending application 204,325 filed July 8, 1927. These machines themselves will not be claimed herein, the present application being directed to the system of which they form integral parts.

Figure 7:
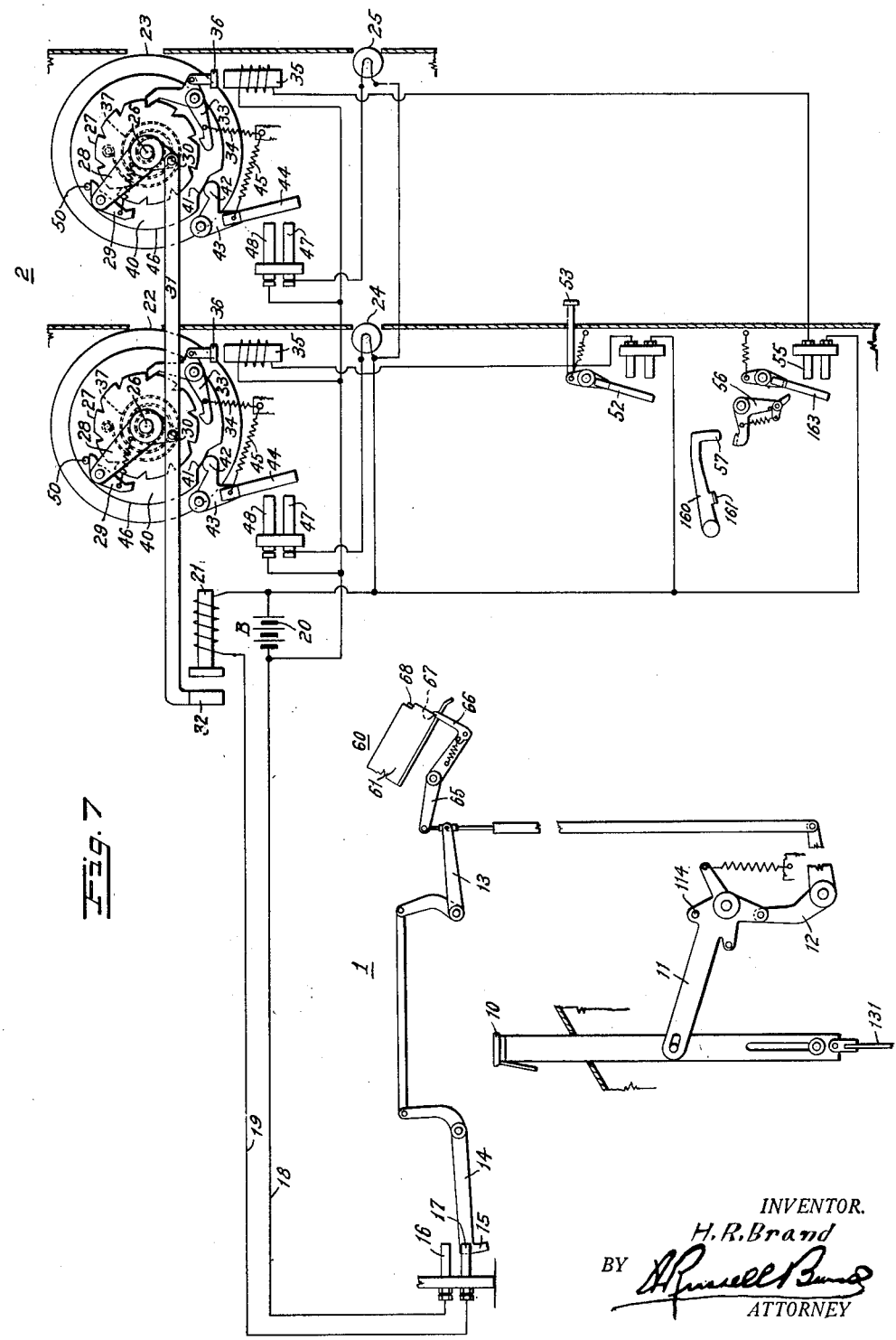
Fig. 7 is a skeleton view showing the correlation of the principal operating mechanism.

The ordering machine comprises primarily a plurality of keys, 10, one corresponding to each article to be ordered. These keys all operate alike so that one only need be described (see Fig. 7). Each key operates, through a series of levers, 11, 12, 13 and 14, a knife switch 15 adapted to connect contacts 16 and 17 to control an electric circuit through wires 18 and 19 from a battery 20 through a magnet 21 at the serving station.

There is provided at the serving station a pair of signals each comprising a dial 22—23 and signal lights 24, and 25. This signal is arranged to be operated by the magnet 21 as follows: The dials 22—23 are each cylindrical and mounted upon a horizontal shaft 26. Attached to each dial is a ratchet 27 and loosely journalled upon the same shaft is a lever 28 carrying at its outer end a spring pressed pawl 29 adapted to cooperate with the teeth of the ratchet 27. The other arm of the lever 28 is attached as at 30 to a link 31 under control of the armature 32 of the magnet 21, the arrangement being such that as the armature is attracted to the magnet the ratchet is carried forward one notch thus moving the dial from one set of numbers to the next.

An escapement dog 33 cooperates with the ratchet to permit its movement under the influence of the lever 28 and to retain it in its advanced positions. The dog 33 is under the control of a spring 34. A magnet 35 is arranged to operate an armature 36 to oscillate the escapement dog to permit the dial to slip backward one step at a time under the influence of a spring 37. A cam 40 is also attached to the dial having a depression 41 opposite a follower arm 42 carried by a lever 43 operating a knife blade switch 44. The depression 41 is so arranged as to permit the follower to enter it when the dial is at its initial or zero position and a spring 45 urges the follower to enter the depression. The cam is also provided with a cylindrical dwell 46 over which the follower 42 may ride as soon as the dial has been moved from its initial or zero position and this dwell is such as to cause the knife blade 44 to make contact between the points 47 and 48 to close the circuit between the battery B and the signal light 24. A stop 50 upon the framework engages the dog 29 to lift it out of contact with the teeth of the ratchet 27 against the opposition of the spring whenever the lever 28 comes to its position of rest. This permits the backward rotation of the dial, step by step in response to the actuation of the magnet 35.

All of the parts thus described for the dial 22 are duplicated in the dial 23 and the magnet 32 is arranged to advance each of these dials one notch with each operation of the magnet 21. The showing of this is diagrammatic, to illustrate the operating principle where as in fact the dials are disposed side by side with their shafts in alignment. These dials differ however, in the control of the magnets 35 by which the dial is restored to zero. The dial 22 has the circuit of its magnet 35 carried through a switch 52 under control of a key 53 which may be operated by hand while the magnet 35 of the dial 23 has its circuit completed through a switch 55 which is controlled by a lever 56 and is automatically operated by the service of the article ordered through the medium of an arm 57 as will be hereinafter more fully described.

Figure 8:
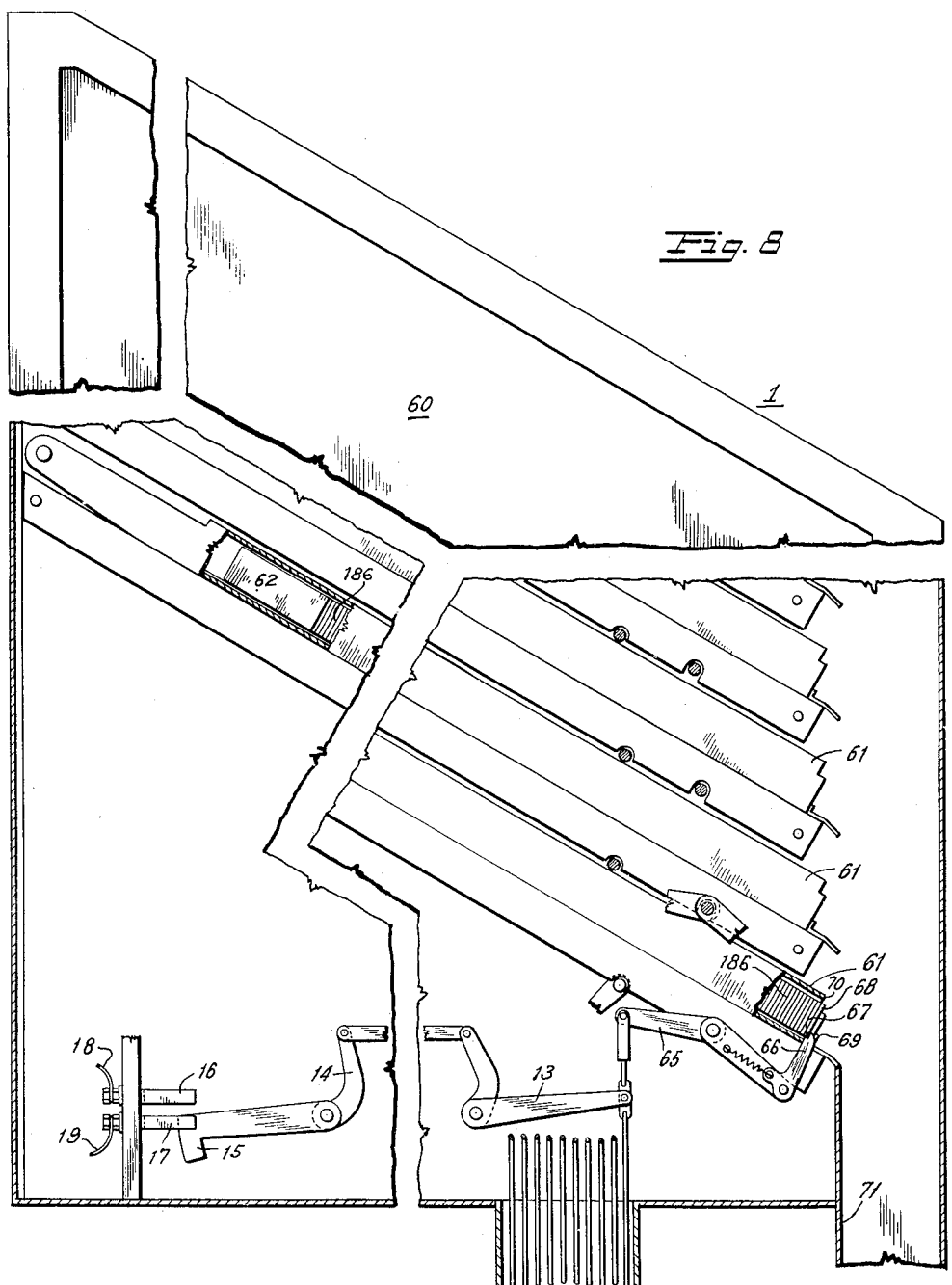
Fig. 8 is an elevation of the tokens receptacle cabinet.

The ordering machine is arranged also to identify the proper recipient of the article ordered and at the same time to register the order and notify the cashier of the price she should collect for it. The mechanism for accomplishing these results is as follows:

Arranged above the bank of keys 10 is a token compartment 60 (see also Fig. 8) and in this token compartment there is arranged a plurality of token magazines 61, one such magazine being provided to cooperate with each key. These tokens may conveniently be in the form of small brass plates having physical characteristics by which each is identified with the particular article to which it corresponds and by which it may be selected by the serving machine to justify the surrender of the article to the recipient. These token magazines 61 are mounted upon an incline one above the other and in each there is provided a follower 62 of sufficient weight to urge the tokens downwardly to the bottom of the incline and means are arranged operated by the key for ejecting one token at a time from the magazine corresponding to the key operated.

As illustrated, the key 10 is arranged to operate a lever 65 carrying a spring pressed ejector arm 66 having a notch 67 to engage the lower corner of the outer token 68 within the magazine 61. A detent 69 within the token magazine normally prevents the lowermost token from sliding out of the receiver but the upper wall of the token magazine terminates at a point 70 such that the ejector arm 66 may engage the outermost token and raise it above the upper edge of the detent 69 and permit it to fall into a chute 71.

The chute 71 is arranged to receive all of the tokens from the machine no matter from what token magazine they may come and conduct them all to a common point and to this end it inclines diagonally downwardly across the back of the machine as can be seen in Fig. 3 terminating in a token receiver 74 (see Figs. 1 and 2). The bottom wall 75 of this receiver is pivoted as at 76 and is operable by levers 77, link 78, lever 79 and link 80 by a handle 81 provided with a full stroke device 82. By this construction when the handle 81 is operated the movement is communicated by the mechanism train to depress the bottom 75 of the token receiver and permit the tokens resting therein to fall downwardly and to be projected outwardly into a pocket 90.

The means for indicating to the cashier the total to be charged for the order (see Fig. 2) comprises a dial 100 carrying a ratchet 101 operated by a pawl 102 and carried by a lever 103 journaled on the shaft 104 of the dial 100. This pawl 102 is spring pressed inwardly to cause the tooth 105 to engage the teeth of the ratchet while a stop 106 engages the pawl to free the ratchet when the lever 103 is at the extreme of its clockwise movement. The lever 103 is operated by a link 110 connected to a bent lever 111, operated by a rod 112.

The rod 112 extends downwardly through the machine to be operated by any one of the keys in alinement with it which happens to be depressed. To this end the rod 112 has a plurality of slots 113 therein each of which is in position to be engaged by a pin 114 carried by the lever 11 operated by the key 10 and a spring 115 normally holds the rod 112 in such position that the lower end of each slot engages the corresponding pin 114 of the relevant key. This connection is such that as any key is depressed a corresponding pin 114 will press the rod 112 downwardly to the left in Figure 2 a movement which causes all the other slots to travel over the corresponding pins and which causes the dog 102 to rotate the dial one notch. A pawl 116 urged by a spring 117 engages the teeth of the ratchet 101 to retain the dial in position once it has been moved there by the pawl 102, and a lever 118 is so connected with the pawl 116 and to a link 119 that on depression of the latter the pawl 116 is withdrawn from the ratchet 101 to permit the dial 100 to be returned to zero by a coil spring 120. The link 119 carries a pin 121 in position to be engaged by an arm 122 upon the lever 79 whereby when the handle 81 is operated the pawl 116 is released.

Each of the keys is provided with a counting mechanism 123 and each bank of keys is provided with a counting mechanism 124 arranged to be operated by the operation of any of the keys so that it will indicate the total of all the orders. It will thus be clear that the counters 123 afford an itemized analysis of the orders whereas the counters 124 yield a group total of items.

Each of the keys is preferably provided with a full stroke device as more fully shown and described in the said copending application but which will not be here further described as it forms no further part of the present system. Means are also provided to prevent the depression of two keys simultaneously, comprising a plurality of sliding dogs 130 carried in a guide way of limited length and a plurality of pins 131 extending downwardly above the dogs, the dogs being combinedly of such length that a pin may be depressed between two adjacent dogs forcing them outwardly to make room for the pin but when one such pin is depressed all the available space is utilized and a depression of any other pin is prevented until the first pin has been withdrawn from contact with the dogs. A limiting bar 132 which limits the pathway of the dogs is carried by pins 133 in slots 134 in the bar, and is spring pressed backwardly by a spring 135. A cam 136 operated by a lever 137 connected to the link 119 engages the rear end 138 of the bar 132 to prevent movement of any key while the handle 81 is depressed.

The serving apparatus consists primarily of a frame 150 having a plurality of compartments 151, each designed to receive a plate containing a particular article of food and having a sign 152 below it to indicate the article of food to which it corresponds. All of these receptacles are alike and it is sufficient to therefore describe the construction of one. It will be understood that there is one such set of signals and one such food compartment for each key 10. The particular construction of these food compartments can be more clearly seen from Figure 6 in which it will be seen that there is provided within the compartment a conveyor 155 extending from front to back in the compartment adapted to receive a plate 156 through the serving entrance 157 on the serving side of the machine and carry the plate through the compartment for delivery to the recipient through the delivery entrance 158.

Figure 10:
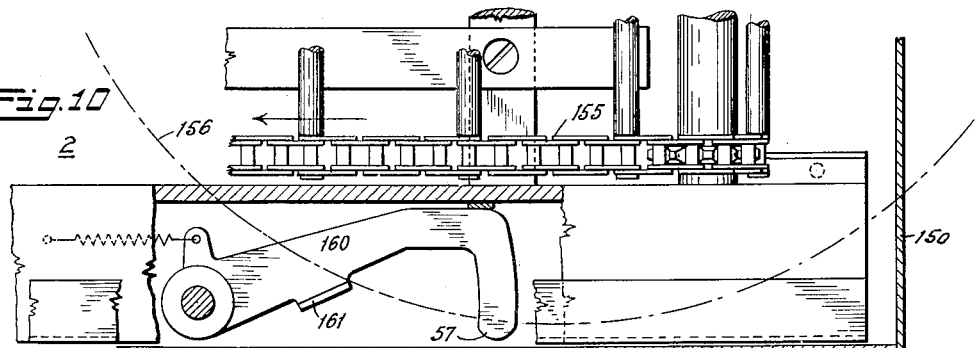
Fig. 10 is a detail of the mechanism by which the service of an article controls the record.

Means are provided within the compartment for engaging a plate once it has been inserted therein and for retaining the same against unauthorized withdrawal while at the same time deleting one of the signals of the dial 23 by operating the magnet 35. As best seen in Figs. 6 and 10 the mechanism comprises a lever 160 having an arm 161 within the pathway of the plate and adapted to be depressed by the plate as the latter is inserted in the compartment. This lever 160 has its end 57 arranged to contact the crank 56 to operate a knife 163 to close the switch 55 to operate the magnet 35 of the dial 23. The switch 55 is arranged to make contact and snap open on depression of the lever so that the continued depression of the arm 161 will not cause the switch to remain closed.

Figure 9:
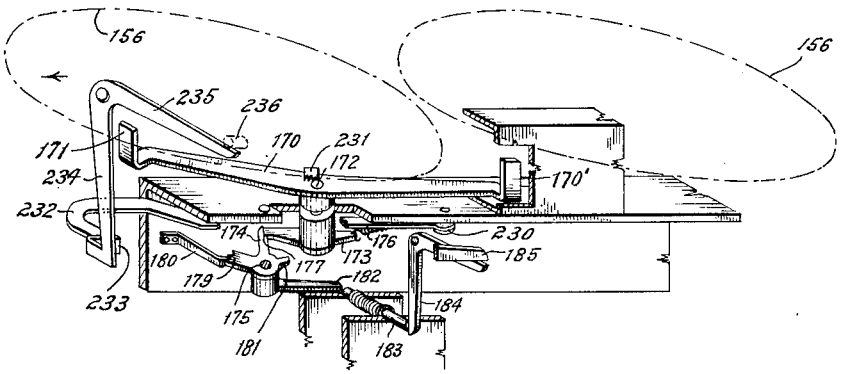
Fig. 9 is a fragmentary perspective of the plate locking mechanism.

At the delivery end of the serving compartment, as best seen in Figs. 6 and 9, there is a lever 170 having an arm 171 also in the pathway of the plate and this lever may be locked in position releasable only in a manner hereafter to be described to prevent unauthorized withdrawal of the plate from the compartment. This control mechanism is as follows:—The lever 170 is pivoted about a shaft 172. Rigidly attached to this lever is an arm 173 which moves into and out of a pathway of a locking dog 174 pivoted upon a shaft 175. A spring 176 tends to hold the arm 171 in the pathway of the plate and the locking dog 174 has a notch 177 adapted to engage the arm 173 to retain it in that position. The arm 174 has a W shaped notch 179 engageable by a spring 180 to cause the arm to be retained in either one of its extreme positions, in one of which the arm 173 is locked by the arm 174 and in the other of which the arm 173 is free to move. There is a projection 181 upon the arm 174 and this projection and the arm are so positioned that when the lever 170 is moved to its extreme position counter clockwise as seen in Figure 9, the arm 173 will engage the projection 181 to cause the dog 174 to move clockwise until the spring 180 engages the left hand portion of the notch 179. The dog is thus resiliently held in position so that on the clockwise movement of the lever 170 the arm 173 will ride over the dog 174 and snap into place at the notch 177. An arm 182 is rigidly attached to the dog 174 and extends into the pathway of a pin 183 operated by the lever 184 which is engaged by the control mechanism 185 so that at the depression of the control lever 185 the pin 183 is pressed inwardly to rotate the dog 174 until the spring 180 engages the right hand notch causing the dog to release the arm 173.

The control mechanism referred to is designed to respond only to a token having particular characteristics, which was ejected by the ordering machine. It has been previously remarked that the token has physical characteristics identifying it with the particular article ordered. It is convenient to make the tokens 186 all of the same precise shape and to effect this differentiation between them by piercing them with perforations 187 having a characteristic distribution over the surface. This will be understood by reference to Figures 6 and 11 of the drawings and is described more in detail in my copending application. The handle 188 carries a rack 189 which moves by a train of gear mechanism 190 to operate the pinion 191 by which the conveyor 155 is moved. A full stroke device 192 comprising a ratchet 193 engaging the rack insures that the handle 188 must be completely withdrawn before it may be returned.

A control casing 196 carries a slot 197 into which the token may be inserted through an opening 198 in the outer casing and within this slot 197 is a block 199 carrying pins 200 spaced to correspond with the perforations of the particular token with which the mechanism is designed to co-operate. The block 199 is slidable vertically on guides 201 to permit the pins 200 to enter recesses 202 in the bottom of the slot.

Figure 11:
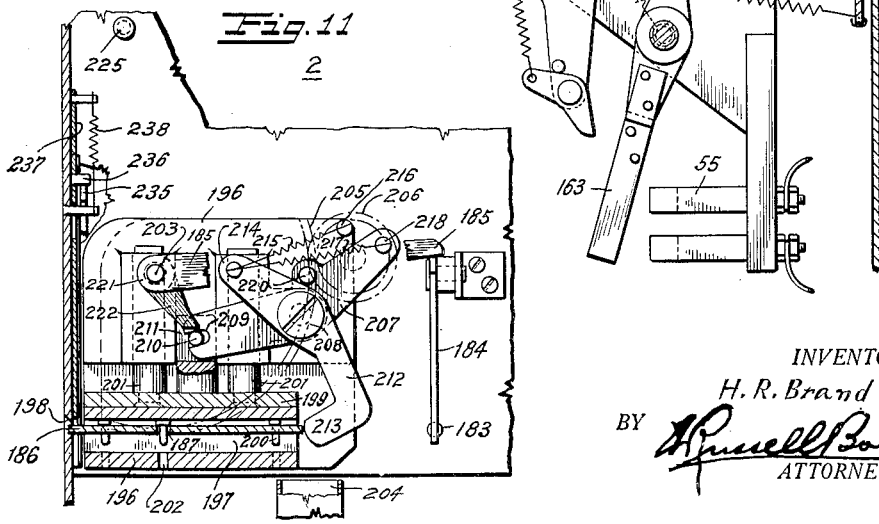
Fig. 11 is a detail of the token responsive article control mechanism.

The control casing 196 is pivoted for movement about an axis 203 which is shown in its lowermost position in Figure 11 and is rotatable counter clockwise from the position to a position at right angles to the position shown in that figure, in which latter position the slot 197 is immediately above and forms the prolongation of a flat tube 204 into which the token is subsequently discharged. The casing 196 carries a gear quadrant 205 operated by a pinion 206 upon the shaft of one of the members of the gear train 190, such that when the rack is moved forwardly the control casing 196 is rotated as has been described.

The control casing carries a lever 207 pivoted at 208 having at its other end a slot 209 engaging a pin 210 upon a post 211 attached to the block 199, whereby on rotation of the arm 207 about its pivot the block 199 is pressed downwardly. An arm 212 is also pivoted at 208, having a finger 213 adapted to enter the slot 197 and to be thrust from the said slot when the token is inserted. This arm 212 carries a projection at its other end 214 connected by a spring 215 with a pin 216 upon the casing 196 and connected by another spring 217 with a pin 218 upon the lever 207. A pin 220 upon the lever 207 is in position to engage the arm 214 serving as a stop for the movement of the lever 212 and also preventing the movement of the lever 207 until the lever 212 has been displaced by the token.

The control mechanism release 185 previously referred to comprises the outer arm of a lever 221 pivoted at 203 in position to engage the lever 184, as has been previously described. This lever 221 carries a downwardly projecting inclined arm 222 in the pathway of the pin 210 and so displaced that as the pin 210 is moved downwardly by the movement of the lever 209 in response to the action of the spring 217, the arm 222 is moved downwardly depressing the member 185 and releasing the latch 174, thus unlocking the plate, lever 170 and permitting the withdrawal of the article to be served.

This withdrawal of the plate causes the rotation of the lever 170 throwing an arm 171 into the pathway of the next coming plate and at the same time restoring the locking dog 174 to position to lock the lever 170 upon its next reverse movement.

When the casing 196 is rotated upwardly the upper extension of the arm 207 engages a pin 225 to force the block 199 outwardly to withdraw the pins 200 from the perforations in the token. Thereupon the lever 212 urged by the spring 215 forces the token outwardly from the slot to fall into the flat tube 204. The tube 204 from each of the food compartments reaches into a separate compartment under lock and key and the accumulation of such tokens accurately corresponds in number to the articles of food delivered.

Should the handle 188 of the rack be withdrawn without the insertion of a token the conveyor 155 will be operated but the plate will not be released by the lever 170 so that the article in fact cannot be removed, because the lever 212 has not been rotated by the token, hence the lever 207 has not been rotated by the spring 217 so that the pin 210 has not been forced outwardly to operate the arm 222. Should attempt be made to utilize the wrong token, the arm 212 will be forced to the position shown in Figure 11 and the block 199 will be urged outwardly but it will be unable to move outwardly because of the interference between the pins and the token. Since, therefore, the pin 210 cannot descend, the member 185 cannot release the lock.

The machine is designed to surrender an article only in response to a proper token. It is desirable therefore that the machine shall be arranged to insure the surrender of an article in response to each token retained by the machine. In the particular embodiment illustrated the surrender is accomplished by permitting the withdrawal of any article which happens to be in a delivering position within the receptacle. It is practical therefore to insure that the insertion of a token shall cause the surrender by preventing the operation of the token releasing means and the retention of the token unless and until an article appears in the surrendering position. In the simple embodiment illustrated means are provided to prevent the insertion of the token at all unless there be a plate in serving position. For this purpose there is pivoted to the frame a lever 230 having a finger 231 in the pathway of the plate. This lever has a projection 232 to engage the arm 233 of a bent lever 234 also pivoted to the frame. This bent lever 234 has its other arm 235 engaged beneath a pin 236 carried by a gate 237 mounted for sliding movement to open and close the token slot, or opening 198. A spring 238 urges the gate to closed position. The operation and arrangements of the parts are such that the presence of a plate engaging the finger 231 will operate the gate to open position against the operation of the spring 238.

The operation of the system will be obvious from the foregoing description: When it is desired to employ the system for service, the patrons may be grouped, placing a waitress in charge of each group, the waitress on taking the order comes up to the machine 1 on the key side of which (to the left in Figure 1) is stationed the cashier. The cashier depresses the key 10 corresponding to the order given her by the waitress. The machine in response thereto automatically signals the order to the server in duplicate as has been previously brought out, and selects the tokens for deposit within the token receptacle. At the same time the machine indicates the amount the cashier is to receive from the waitress. When the waitress has paid the cashier in cash, the amount of the total of the order, using a supply of change which has been previously allotted to her, the cashier by depressing the lever 81 releases to the waitress the tokens for which she had paid. Thereafter while the waitress is serving other customers or setting the table for the guests, the food is prepared to order by the cook in response to the signals given to him.

As soon as the order is received by the server he may acknowledge it by setting back one of the indicators to zero thereby extinguishing the corresponding signal light. The server deposits each order when ready within the corresponding food receptacle upon the conveyor 155. This deposit automatically sets back the other indicator and when the indicator reaches zero extinguishes the corresponding indicator light.

The waitress after waiting sufficient time to insure that the food is ready, presents herself to the serving receptacle 2 at the delivery side which is the left hand side as seen in Figure 1. She may grasp the handle 188 and thereby move the conveyor until the plate containing the order has reached the outer end of the conveyor in delivery position where it is locked by the plate locking mechanism. This automatically opens the slot for the insertion of the token. The token may now be inserted and the handle again pulled whereupon the token receiving mechanism operates as has been previously described to cause the pin 183 to release the dog 174 to permit the rotation of the arm 170 to release the plate. At the same time the token itself drops into a locked receptacle through the slot 204.

The waitress having paid for the order in advance must, to save herself from financial loss, insist upon repayment from the guest. At the same time the ordering machine having automatically registered the orders and their amounts, checks the cashier as to the total cash to be received by her. Moreover since the tokens are delivered only by the mechanism which automatically registers the orders there is a record kept of the articles delivered by means of which control may be had over the cook. The cook is thus thoroughly checked by causing him to receipt for the food delivered to him and requiring him to account for all food not represented by the tokens collected within the machine.

It will thus be seen that by this system not only is the speed of delivery in high speed restaurant greatly increased together with a marked improvement in the service but also a complete account is made of all transactions which accounting therefore was wholly impractical in any high speed restaurant and moreover as a result thereof, there is a complete check upon the food supply, ascertaining that every article leaving the store room is ultimately represented by cash in the cash drawer. Furthermore, by reason of the fact that the chef is able to acknowledge orders when received and serve them when they are ready regardless of the presence or absence of the waitress, he is able to keep track at all times of the number of orders still to be prepared.

When it is desired to employ the system as the self service system no change in the mechanism, whatever, is required. The guest himself may go to the cashier and deliver his order verbally and pay for it in the manner previously described for the waitress. In exchange for his money he accepts the tokens. He may then proceed to the serving machine and take out the articles ordered, in the manner previously described and the merchandising transaction is completed. In this instance, also, there is a complete check upon the cashier and the cook. At the same time it is possible to prepare the food specially upon order in either the service or the cafeteria type restaurant, with a complete accounting system carried out automatically.

Since certain changes in carrying out the above process and in the constructions set forth which embody the invention, may be made without departing from its scope, it is intended that all matter contained in the above description or shown in the accompanying drawings shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

I claim:

1. The process of dispensing a single article from a group of dissimilar articles which comprises mechanically performing an act characteristically initiatory of the delivery of the desired article and thereby automatically identifying the patron with the article ordered and releasing the article by surrender of the identification.

2. The process of dispensing a single article from a group of dissimilar articles which comprise mechanically performing an act characteristically initiatory of the delivery of the desired article and thereby automatically issuing to the patron a token having mechanical characteristics peculiar to the article and releasing the article by surrender of the token.

3. The process of dispensing a single article from a group of dissimilar articles which comprises mechanically performing an act characteristically initiatory of the delivery of the desired article and thereby automatically issuing to the patron a token having mechanical token selecting characteristics peculiar to the article and releasing the article by surrender of the token and mechanically selecting the token for surrender.

4. The process of dispensing a single article from a group of dissimilar articles which comprises mechanically performing the act of ordering the article and thereby automatically identifying the patron with the article ordered and releasing the article by surrender of the identification.

5. The process of dispensing a single article from a group of dissimilar articles which comprises mechanically performing the act of ordering the article and thereby automatically issuing to the patron a token having mechanical characteristics peculiar to the article and releasing the article by surrender of the token.

6. The process of dispensing a single article from a group of dissimilar articles which comprises mechanically performing the act of ordering the article and thereby automatically issuing to the patron a token having mechanical token selecting characteristics peculiar to the article and releasing the article by surrender of the token.

7. The process of dispensing a single article from a group of dissimilar articles which comprises transmitting an order for the article to a distant point mechanically and thereby automatically identifying the patron with the article ordered and registering the order at a distant point and deleting said registration by service of the article.

8. The process of dispensing a single article from a group of dissimilar articles which comprises transmitting an order for the article to a distant point mechanically and thereby automatically issuing to the patron a token having mechanical characteristics peculiar to the article, registering the order at a distant point in duplicate and deleting one of said registrations by hand and deleting the other registration by service of the article.

9. The process of dispensing a single article from a group of dissimilar articles which comprises transmitting an order for the article to a distant point mechanically and thereby automatically issuing to the patron a token having mechanical characteristics peculiar to the article and registering the order at a distant point, and deleting said registration by service of said article.

10. The process of dispensing a single article from a group of dissimilar articles which comprises transmitting an order for the article to a distant point mechanically and thereby automatically issuing to the patron a token having mechanical characteristics peculiar to the article and registering the order at a distant point, and deleting said registration by service of said article and surrender of the article in exchange for the token.

11. The process of dispensing a single article from a group of dissimilar articles which comprises transmitting an order for the article to a distant point mechanically and thereby automatically issuing to the patron a token having mechanical characteristics peculiar to the article and registering the order at a distant point and deleting said registration by service of said article and surrender of the article in exchange for the token and mechanically selecting the proper token before surrender of the article.

12. The process of dispensing a single article from a group of dissimilar articles which comprises transmitting an order for the article to a distant point mechanically and thereby automatically issuing to the patron a token having mechanical characteristics peculiar to the article and registering said order in duplicate at a distant point and deleting one of said registrations by hand and deleting the other of said registrations by service of the article and surrender of the article in exchange for the token.

13. The process of dispensing a single article from a group of dissimilar articles which comprises transmitting an order for the article to a distant point mechanically and thereby automatically issuing to the patron a token having mechanical characteristics peculiar to the article and registering said order in duplicate at a distant point and deleting one of said registrations by hand and deleting the other of said registrations by service of the article and surrender of the article in exchange for the token and mechanically selecting the proper token before surrender of the article.

14. The process of dispensing a single article from a group of dissimilar articles which comprises transmitting an order for the article to a distant point mechanically and thereby automatically issuing to the patron a token having mechanical token selecting characteristics peculiar to the article and registering the order at a distant point and deleting said registration by service of said article.

15. The process of dispensing a single article from a group of dissimilar articles which comprises transmitting an order for the article to a distant point mechanically and thereby automatically issuing to the patron a token having mechanical token selecting characteristics peculiar to the article and registering the order at a distant point and deleting said registration by service of said article and surrender of the article in exchange for the token.

16. The process of dispensing a single article from a group of dissimilar articles which comprises transmitting an order for the article to a distant point mechanically and thereby automatically issuing to the patron a token having mechanical token selecting characteristics peculiar to the article and registering the order at a distant point and deleting said registration by service of said article and surrender of the article in exchange for the token and mechanically selecting the proper token before surrender of the article.

17. The process of dispensing a single article from a group of dissimilar articles which comprises transmitting an order for the article to a distant point mechanically and thereby automatically issuing to the patron a token having mechanical token selecting characteristics peculiar to the article and registering said order in duplicate at a distant point and deleting one of said registrations by hand and deleting the other of said registrations by service of the article.

18. The process of dispensing a single article from a group of dissimilar articles which comprises transmitting an order for the article to a distant point mechanically and thereby automatically issuing to the patron a token having mechanical token selecting characteristics peculiar to the article and registering said order in duplicate at said distant point and deleting one of said registrations by hand and deleting the other of said registrations by service of the article and surrender of the article in exchange for the token.

19. The process of dispensing a single article from a group of dissimilar articles which comprises transmitting an order for the article to a distant point mechanically and thereby automatically issuing to the patron a token having mechanical token selecting characteristics peculiar to the article and registering said order in duplicate at a distant point and deleting one of said registrations by hand and deleting the other of said registrations by service of the article and surrender of the article in exchange for the token and mechanically selecting the proper token before surrender of the article.

20. A device of the character described comprising in combination means for ordering an article for subsequent delivery, means operated by the ordering means for identifying the patron and means for retaining the article, releasable by surrender of the identification.

21. A device of the character described comprising in combination means for ordering an article for subsequent delivery, means operated by the ordering means for identifying the patron and means for retaining the article releasable by surrender of the identification, and means for registering the order at the ordering point.

22. A device of the character described comprising in combination means for ordering an article for subsequent delivery, means operated by said ordering means for issuing and identifying token and means for retaining possession of the article releasable by surrender of the token.

23. A device of the character described comprising in combination means for ordering an article for subsequent delivery, means operated by said ordering means, for issuing an identifying token and means for retaining possession of the article releasable by surrender of the token and means for registering the order at the ordering point.

24. A device of the character described comprising in combination means for ordering an article for subsequent delivery, means operated by the ordering means for issuing a token having mechanical token selecting characteristics and means for retaining the article releasable on surrender of the token, means for mechanically selecting the token for surrender.

25. A device of the character described comprising in combination means for ordering an article for subsequent delivery, means operated by the ordering means for issuing a token having mechanical token selecting characteristics and means for retaining the article releasable on surrender of the token, means for mechanically selecting the token for surrender and registering the order at the ordering point.

26. A device of the character described comprising in combination means for ordering an article at a distant point, means for registering said order at said point and means operated by said ordering means for identifying the patron and means for retaining the article releasable by surrender of the token and means for deleting said registration.

27. A device of the character described comprising in combination means for ordering an article at a distant point, means for registering said order at said point and means operated by said ordering means for identifying the patron and means for retaining the article releasable by surrender of the token.

28. A device of the character described comprising in combination means for ordering an article at a distant point, means for registering said order at said point and means operated by said ordering means for identifying the patron and means for retaining the article releasable by surrender of the token and means for deleting said registration by service of the article.

29. A device of the character described comprising in combination means for ordering the article at a distant point, means operated by said ordering means for issuing and identifying token and means for retaining possession of the article releasable by surrendering of the token.

30. A device of the character described comprising in combination means for ordering the article at a distant point, means operated by said ordering means for issuing and identifying token and means for retaining possession of the article releasable by surrendering of the token and means for deleting said order.

31. A device of the character described comprising in combination means for ordering the article at a distant point, means operated by said ordering means for issuing and identifying token and means for retaining possession of the article releasable by surrendering of the token and means for deleting said order by service of the article.

32. A device of the character described comprising in combination means for ordering an article at a distant point, means operated by the ordering means for issuing a token having mechanical token selecting characteristics and means for retaining the article releasable on surrender of the token means for mechanically selecting the token for surrender.

33. A device of the character described comprising in combination means for ordering an article at a distant point, means operated by the ordering means for issuing a token having mechanical token selecting characteristics and means for retaining the article releasable on surrender of the token means for mechanically selecting the token for surrender and means for deleting said order.

34. A device of the character described comprising in combination means for ordering an article at a distant point, means operated by the ordering means for issuing a token having mechanical token selecting characteristics and means for retaining the article releasable on surrender of the token means for mechanically selecting the token for surrender and means for deleting said order by service of the article.

35. A device of the character described comprising in combination means for ordering an article at a distant point, means for registering said order in duplicate, means operated by the ordering means for identifying the patron and means for retaining the article releasable by surrender of the identification, and means for deleting one of said registrations by hand.

36. A device of the character described comprising in combination means ordering an article at a distant point, means for registering said order in duplicate, means operated by said ordering means for issuing and identifying token and means for retaining possession of the article releasable by surrender of the token, and means for deleting one of said registrations by service of the article and means for deleting one of said records by hand.

37. A device of the character described comprising in combination means ordering an article at a distant point, means for registering said order in duplicate, means operated by the ordering means for issuing a token having mechanical token selecting characteristics and means for retaining the article releasable on surrender of the token, means for retaining the article releasable on surrender of the token means for mechanically selecting the token for surrender and means for deleting one of said registrations by service of the article and means for deleting one of said registrations by hand.

38. A device of the character described comprising in combination, means for ordering an article and thereby automatically issuing an article identifying token, a receptacle for receiving said article in response to said order at the will of the server and token releasable means for surrendering the article from said receptacle and means controlled by the absence of an article within the receptacle for preventing the retention of a token.

39. A device of the character described comprising in combination means for ordering an article and thereby automatically issuing an article identifying token and registering the order at a distant point, a receptacle for receiving said article in response to said order at the will of the server and means operated by said receipt of the article to delete the ordering registration and token releasable means for surrendering the article from said receptacle mean controlled by the absence of an article within the receptacle for preventing the retention of a token.

40. A device of the character described comprising in combination means for ordering an article in duplicate and thereby automatically issuing an article identifying token and manual means for deleting one of said orders, a receptacle for receiving said article in response to said order at the will of the server and means operable by receipt of the order to delete the other order, and token releasable means for surrendering the article from said receptacle mean controlled by the absence of an article within the receptacle for preventing the retention of a token.

41. A device of the character described comprising in combination means for ordering an article at a distant point and thereby automatically issuing an article identifying token, a food receptacle at said distant point having token releasable means for surrendering the article and means for preventing the retention of a token in the absence of an article in the receptacle.

In testimony whereof, I have signed this specification.

HARRY RUSSELL BRAND.